United States Patent Office 3,313,512
Patented Apr. 11, 1967

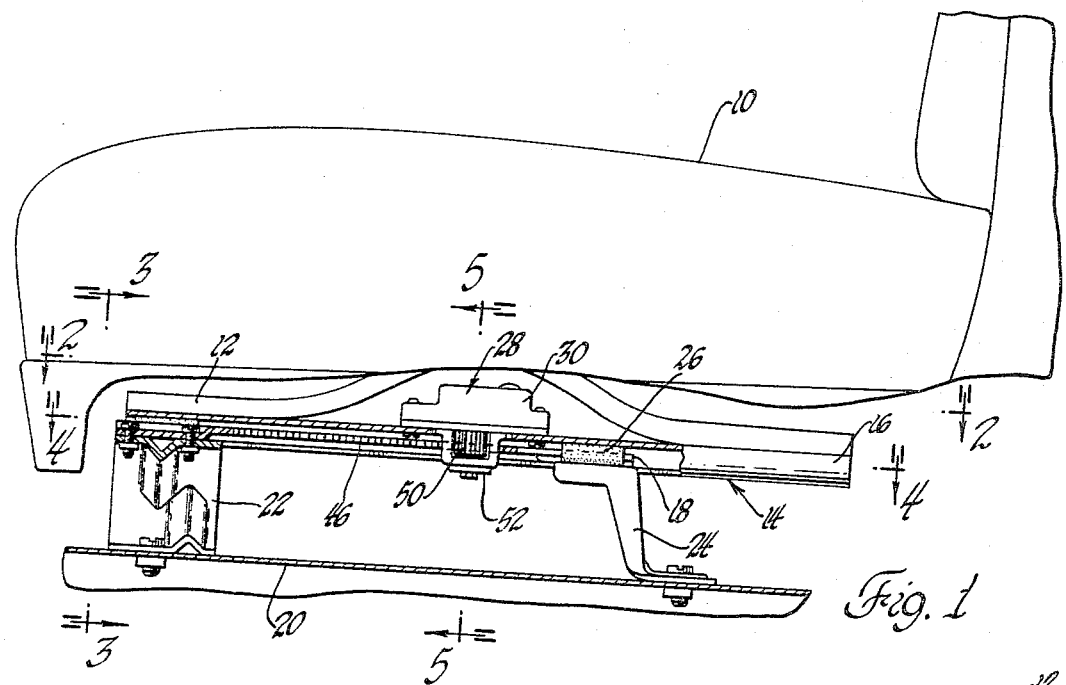
Fig. 1
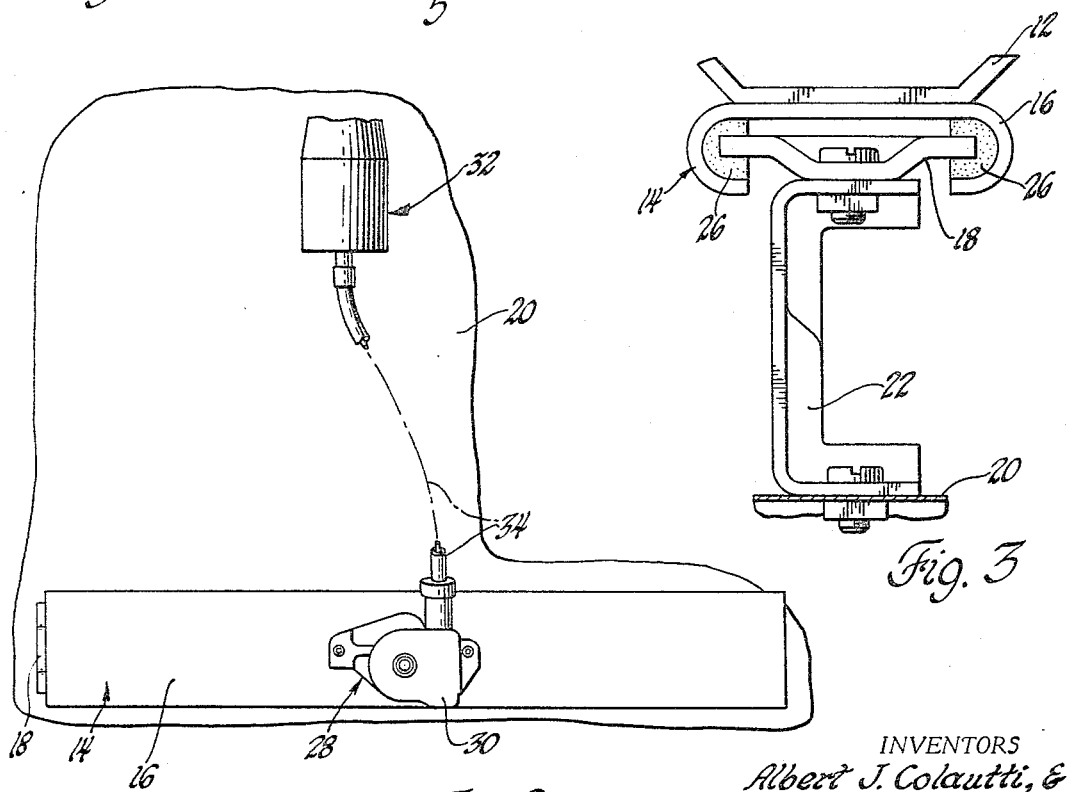
Fig. 2
Fig. 3
INVENTORS
Albert J. Colautti, &
BY Bela Sandor
Robert L. Spencer
ATTORNEY INVENTORS
Albert J. Colautti, &
BY Bela Sandor Robert L. Spencer
ATTORNEY

3,313,512
HORIZONTAL DRIVE MEANS FOR POWERED SEAT ADJUSTERS
Albert J. Colautti, Windsor, Ontario, Canada, and Bela Sandor, Detroit, Mich., assignors to General Motors Corporation, Detroit, Mich., a corporation of Delaware
Filed Sept. 3, 1965, Ser. No. 484,917
7 Claims. (Cl. 248—424)

This invention relates to power seat adjusters such as are used in automotive vehicles and more particularly to a horizontal drive means for powered seat adjusters.

The safety factor in an automotive vehicle has become more important with the increased speed of the modern automobile. Sudden deceleration stops have become more commonplace and seat belts have been installed in vehicles to protect the passengers and drivers thereof. In most instances the ends of the seat belt have been anchored to the vehicle floor but such an arrangement has presented the problem of adjusting the seat belt each time the seat is adjusted. To overcome this problem it has been proposed that the seat belts be anchored to the vehicle seat frame so that adjustment of the seat adjuster will not affect the seat belt.

By attaching the seat belt to the seat frame, the forces formerly absorbed by the seat belt anchor to the vehicle floor are now absorbed by the seat adjuster and its anchoring means to the floor. The common rack and pinion drive used to move a vehicle seat adjuster horizontally are often bent so that they do not properly engage each other when excessive forces are imposed thereupon by the sudden stops of the vehicle when the seat belt is attached to the seat. When the pinion becomes disengaged with the rack, the seat adjuster is then free to move fore and aft. Such movement of the seat and passenger imposes greater loads on the seat adjuster anchoring means and the interconnecting track due to the impact loading thereof.

It is an object of this invention to provide a horizontal rack and pinion drive means for a powered seat adjuster which has increased strength to resist impact loading imposed thereupon by sudden stops of the vehicle and prevent disengagement of the pinion from the rack during such loading.

Another object of this invention is to provide a drive pinion and rack with a slave pinion meshingly engaging the drive pinion and slave rack for securing the drive pinion in contact with its rack and preventing bending or lateral movement thereof whereby the drive pinion will become disengaged from its rack by impact loading.

A further object of this invention is to provide safety means for preventing vertical and lateral movement of the drive pinion from engagement with its associated rack whereby the tracks of the seat adjuster would be free to move relative to each other.

These and other objects of this invention will become more apparent as reference is had to the accompanying specification and drawings wherein:

FIGURE 1 is a side view of a powered horizontal seat adjuster supporting a vehicle seat and incorporating the drive means of the present invention.

FIGURE 2 is a view taken substantially along the line 2—2 of FIGURE 1 showing the reversible electric motor, flexible drive cable and drive means of the present invention.

FIGURE 3 is an enlarged view taken substantially along the line 3—3 of FIGURE 1 illustrating the manner in which the seat frame, upper track, lower track and support legs are connected and mounted on the vehicle floor.

Figure 6:
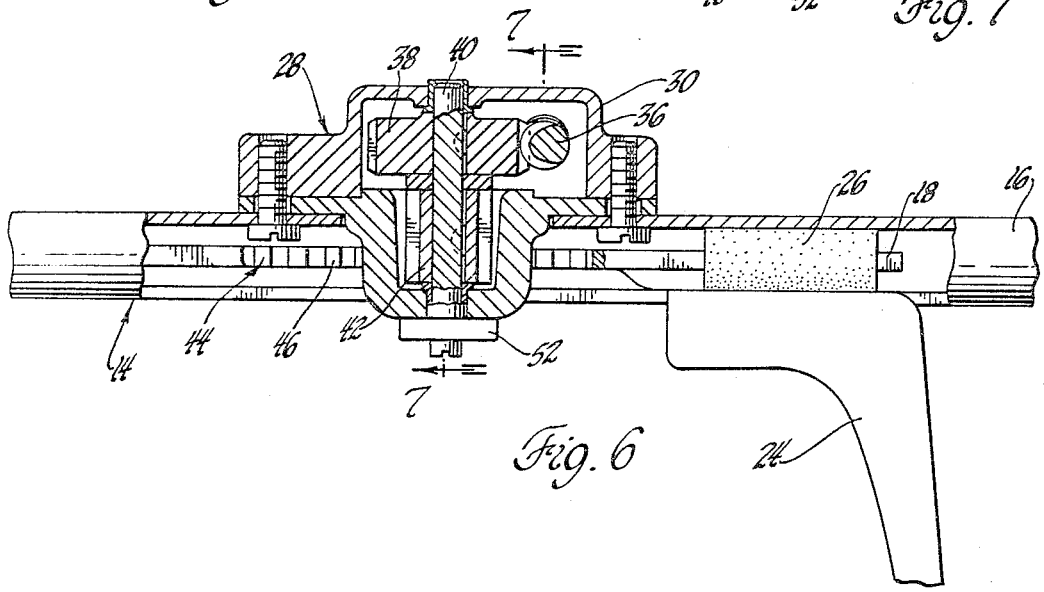

FIGURE 6 is an enlarged side view, with portions cut away, illustrating the manner in which the upper and lower tracks are interconnected by antifriction slugs and supported on the rear support leg and also showing the worm in meshing engagement with the worm gear which is secured on the common drive shaft with the drive pinion and the manner in which the drive unit housing is secured to the upper track.

Figure 4:
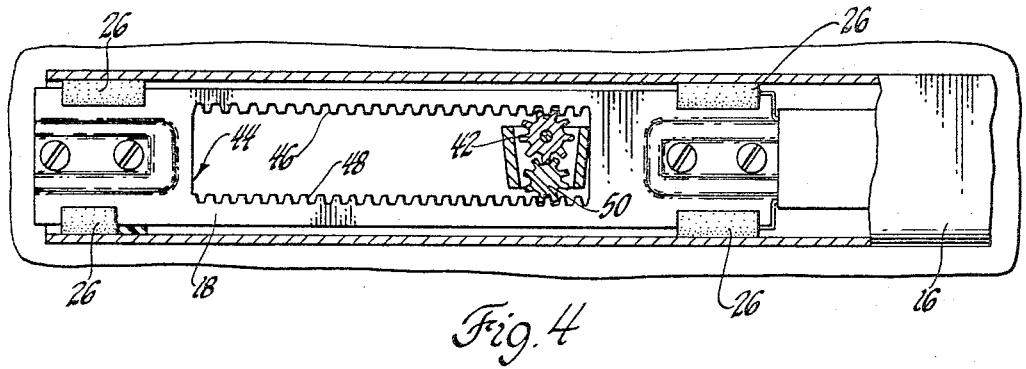
FIGURE 4 is a view taken substantially along the line 4—4 of FIGURE 1 showing the drive pinion, slave pinion and associated racks in assembled relationship.
Figure 5:
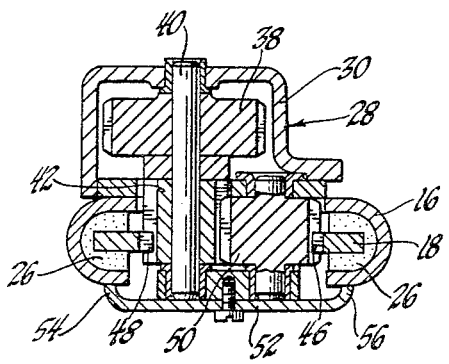
FIGURE 5 is an enlarged view taken substantially along the line 5—5 of FIGURE 1 showing a cross sectional view of the upper and lower track with the drive pinion in meshing engagement with its associated rack and the slave pinion in meshing engagement with the drive pinion and its associated rack and the worm gear secured to the common shaft with the drive pinions.
Figure 7:
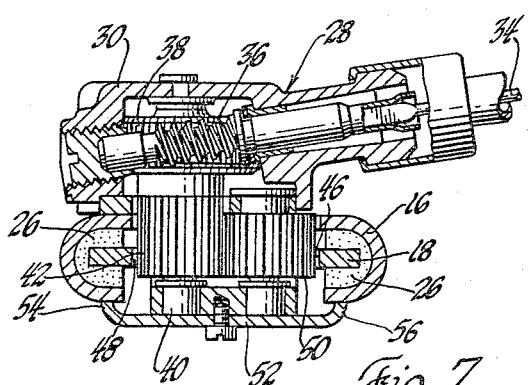

FIGURE 7 is a view taken substantially along the line 7—7 of FIGURE 6, with portions cut away, illustrating the manner in which the flexible drive cable is connected to the worm and the worm is in meshing engagement with the worm gear connected to the common shaft with the drive pinion and also illustrating the drive pinions in meshing engagement with its associated rack and the slave pinion in meshing engagement with the drive pinion and its associated rack.

Referring now to the drawings, particularly FIGURES 1 through 3, a vehicle seat 10 is secured to and supported by an upper support member 12 which in turn is supported on a horizontal seat adjuster indicated generally by the numeral 14. The horizontal adjusting mechanism 14 consists of an elongated upper track 16 of generally C-shaped cross section which supports the seat 10 and is secured to the upper support member 12 by welding or other suitable means.

An elongated lower track 18 having generally U-shaped end portions is secured to the vehicle floor 20 by front and rear support legs 22, 24, respectively. The generally U-shaped end sections of the lower track 18 are positioned in mating engagement with the C-shaped upper track 16. In order to mount the upper track 16 on the U-shaped sections of the lower track 18 for slidable movement therealong, a plurality of bearing slugs 26 of antifriction material, preferably nylon, are fixedly mounted on the U-shaped portions of the lower channel. The mating tracks and nylon slugs are of the type shown in United States Patent 3,013,763 and well known in the art.

The horizontal drive means indicated generally by the numeral 28 and best seen in FIGURES 4 through 7, is enclosed in a housing 30 which is secured by bolts or other suitable means to the upper track 16. Power is supplied to the horizontal drive means 28 by a reversible electric motor 32 (see FIGURE 2) and is transmitted to the drive means by a flexible cable 34 which is operably connected to an input worm 36, as best seen in FIGURE 7. The reversible motor may be controlled by conventional means for manually selecting the direction of rotation thereof and thereby selecting the position of adjustment of the seat.

The input worm 36 is in meshing engagement with the worm gear 38 secured on a shaft 40 which is journaled in the drive housing 30. A drive pinion 42 is also secured on shaft 40 for rotation therewith.

Thus, as power is transmitted from the electric motor 32 to the flexible cable 34 to the input worm 36, the meshing engagement of the input worm 36 with the worm gear 38 drives shaft 40 in one direction or the other dependent upon the direction of rotation of the electric motor 32 and also rotates the drive pinion 42 secured to the shaft 40.

When the housing 30 is positioned and secured on the upper track 16, the drive pinion 42 and a portion of the housing 30 extends below the surface of the upper track through an aperture 44 in the lower track 18. The aperture 44 is an elongated opening in the lower track which includes a pair of parallel racks 46, 48 formed therein and extending longitudinally of the lower track 18 and parallel to the edges thereof. The drive pinion 42 is in meshing engagement with rack 46.

A slave pinion 50 is journaled in the housing 30 for rotation about an axis parallel to the axis of shaft 40. The slave pinion 50 is in meshing engagement with the drive pinion 42 for rotation therewith and the slave pinion 50 is also in meshing engagement with the rack 48.

A safety plate 52 is secured to the housing 30 by a bolt or other suitable means with the ends 54 and 56, respectively, contacting the lower side of the upper track. The safety plate 52 may bear against the upper track 16, as shown, or if desired may be secured to the upper track so that the lower track 18 is surrounded and the drive pinion and slave pinion are prevented from disengaging with the racks of the lower track during sudden stops causing impact loading between the track members. The slave pinion 50 rotates with the drive pinion 42 and also prevents its disengagement from the rack 46 by lateral movement of the drive pinion by external forces.

In operation, as the electric motor 32 drives the flexible cable and the input worm 36 rotates the worm gear 38 and shaft 40, thus rotating drive pinion 42 which moves longitudinally on the rack 46 formed in the lower track 18, it can be seen that the upper track will be moved relative to the lower track and the vehicle seat will be adjusted in a fore and aft direction. Such movement of drive pinion 42 also causes slave pinion 50 to rotate with the drive pinion and move along rack 48.

With the increased use of seat belts in vehicles, more proposals have been made that seat belts be secured to the seat frame rather than to the vehicle floor whereby added stresses would be imposed on the conventional rack and pinion drives of powered horizontal seat adjusters. The use of the slave pinions 50 in meshing engagement with the drive pinion 42 and the rack 48 secures the drive pinion in engagement with the rack 46 and prevents lateral movement thereof by any external force. The addition of the safety plate 52 also prevents the vertical movement of the pinion 42 from engagement with the rack 46 and further assures that the pinion will remain engaged therein and not free the seat for uncontrolled fore and aft movement.

This arrangement has greater strength than the common single tooth contact of the rack and pinion drive and increases the shock resistance of the drive means to absorb shocks imposed thereon by seat belts anchored to the vehicle seat.

While but one embodiment of the invention has been shown and described, it will be evident that numerous changes and modifications may be made therein without departing from the spirit and scope of the following claims.

We claim:

1. In a vehicle body having a vehicle seat, a seat adjuster supporting said vehicle seat on said body for fore and aft horizontal adjustment, a horizontal drive means for said seat adjuster having an upper track secured to and supporting said seat, a lower track secured to said body and engaging said upper track for supporting said upper track and said seat during generally horizontal fore and aft movement, an elongated aperture formed in said lower track having opposed parallel rack sections formed therein, a drive pinion journaled on and secured to said upper track for movement therewith, said drive pinion meshingly engaging one of said rack sections, a slave pinion journaled on said upper track for movement therewith and meshingly engaging said drive pinion and said other track section for securing said drive pinion in meshing engagement with said one of said rack sections, reversible power means operably connected to said drive pinion for selectively rotating said drive pinion in opposite directions for moving said pinion longitudinally on said rack whereby said seat is adjusted horizontally fore and aft to selected adjustments.

2. Apparatus as claimed in claim 1 having plate means secured to the lower side of said upper track and being effectively connected to said drive pinion for preventing vertical movement of said drive pinion relative to said lower track.

3. In a vehicle body having a vehicle seat, a seat adjuster supporting said vehicle seat on said body for fore and aft horizontal adjustment, a horizontal drive means for said seat adjuster having an upper track secured to and supporting said seat, a lower track secured to said body and engaging said upper track for supporting said upper track and said seat during generally horizontal fore and aft movement, an elongated aperture formed in said lower track having opposed parallel rack sections formed therein, a drive pinion journaled on said upper track for movement therewith, said drive pinion meshingly engaging one of said rack sections, a slave pinion journaled on said upper track for movement therewith and meshingly engaging said drive pinion and said other track section for securing said drive pinion in meshing engagement with said one of said rack sections, a worm gear drivingly connected to said drive pinion, a drive worm meshingly engaging said worm gear, reversible power means operably connected to said worm gear for selectively rotating said drive pinion in opposite directions for moving said pinion longitudinally on said rack whereby said seat is adjusted horizontally fore and aft to selected adjustments.

4. Apparatus as claimed in claim 3 having plate means secured to the lower side of said upper track and being effectively connected to said drive pinion for preventing vertical movement of said drive pinion relative to said lower track.

5. In combination with a horizontal seat adjuster having an upper track interconnected with a lower track for slidably adjusting a vehicle seat generally horizontally fore and aft in a vehicle body, a drive means for said adjuster including a housing secured to said upper track for movement therewith, an elongated aperture formed in said lower track for receiving a portion of said housing, said aperture having parallel opposed first and second racks formed therein extending longitudinally of said lower track, a drive pinion journaled in said housing and meshingly engaging said first rack for movement therealong when rotated, a slave pinion journaled in said housing adjacent said drive pinion and meshingly engaging said drive pinion and said second rack for rotation with said drive pinion and movement along said second rack, and reversible power means operably connected to said drive pinion for selectively rotating said drive pinion whereby said drive pinion will move on said first rack and adjust the upper track horizontally fore and aft relative to the lower track.

6. Apparatus as claimed in claim 5 wherein a safety plate is secured to said housing extending through said aperture in said lower track, and said safety plate contacts opposite sides of said upper track for preventing vertical movement of said housing and said drive pinion from said aperture.

7. In combination in a vehicle body having a vehicle seat, a horizontal seat adjuster including an upper track secured to said seat, a lower track secured to said body and being slidably connected to said upper track for supporting said upper track and said seat during generally horizontal fore and aft movement relative thereto, a horizontal drive means for said seat adjuster, a reversible power source, manual control means for selectively actuating said power source, a power transmission means for operably connecting said power source to said drive means, said drive means including an elongated aperture formed in said lower track having opposed parallel first and second rack sections extending longitudinally of said track and substantially parallel to the edges thereof, a housing secured on said upper track for movement therewith, said housing extending through said aperture in said lower track and having a safety plate secured thereto and to the lower side of said upper track for substantially enclosing said lower track by said upper track and said safety plate, a drive pinion journaled in said housing and operably connected to said power transmission means for selective rotation thereby, said drive pinion meshingly engaging said first rack section for movement therealong when rotated, and a slave pinion journaled in said housing in meshing engagement with said drive pinion and said second rack section for rotation by and with said drive pinion whereby said drive pinion is held in contact with said first rack section when lateral external forces are applied thereto and vertical movement by external forces to said drive pinion is prevented by said housing and said safety plate.

References Cited by the Examiner

UNITED STATES PATENTS

| | | | |
|---|---|---|---|
| 1,384,339 | 7/1921 | Powell | 74—29 |
| 2,930,428 | 3/1960 | De Rose | 296—65 |
| 2,946,326 | 7/1960 | Bates et al. | 296—65 |
| 3,125,318 | 3/1964 | Lohr et al. | 248—419 |
| 3,137,472 | 6/1964 | Louton et al. | 248—419 |

MILTON BUCHLER, *Primary Examiner.*

J. H. BRANNEN, *Assistant Examiner.*